Patented Mar. 8, 1949

2,463,810

UNITED STATES PATENT OFFICE 2,463,810

BENZANTHRONYLAMINO DIANTHRIMIDE ACRIDONES

Mario Scalera, Somerville, and Asa W. Joyce, Plainfield, N. J., assignors to American Cyanamid Company, New York, N. Y., a corporation of Maine No Drawing. Application June 1, 1944, Serial No. 538,343

4 Claims. (Cl. 260—276)

This invention relates to alpha benzanthronylamine dianthrimide acridones. The products may be derivatives of 1,1' dianthrimide 2,2' acridone, which has the formula:

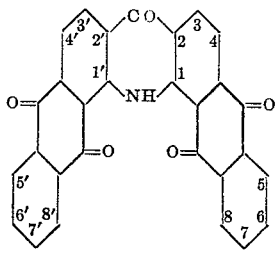

They may also be derivatives of 1,2' dianthrimide 2,1' acridone, which has the formula:

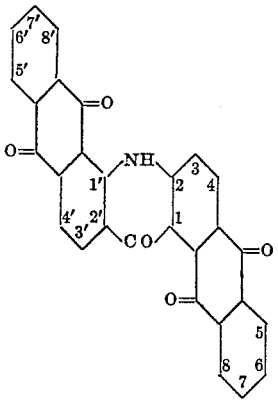

These dianthrimide acridones are substituted in at least one alpha position by the residue:

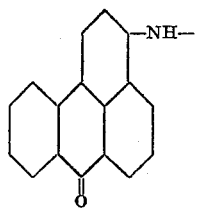

The products of the present invention are dark brown to blue to gray powders which are very sparingly soluble in high boiling organic solvents such as nitrobenzene and dissolve in concentrated sulfuric acid to form orange to brown solutions which turn green or blue on partial dilution and precipitate the products on further dilution. The products are vat dyes and are capable of dyeing cellulosic fibers weak shades from violet to violet-brown alkaline hydrosulfite vats. The technical importance of these products, however, does not lie in their use per se as vat dye stuffs, but on their use as intermediates to produce more highly condensed dyestuffs by ring closure in the presence of acid or alkaline condensing agents.

The dyestuffs produced are vat dyestuffs of technical value. They are, however, not claimed in the present application, forming the subject matter of our copending application Serial No. 538,345, filed June 1, 1944.

The products of the present invention are readily prepared by reacting amino dianthrimide acridones with a bz1-halogen benzanthrone such as for example bz1-bromo benzanthrone. The reaction is best effected in a high boiling organic solvent such as nitrobenzene in the presence of an acid-binding agent and a cupriferous catalyst. It is an advantage of the present invention that the reaction proceeds smoothly and that the conditions are similar to those encountered in other Ullmann reactions.

Some of the amino dianthrimide acridones used as raw materials in the present invention are in themselves new compounds and are described and claimed in our copending application, Ser. No. 538,344, filed June 1, 1944. They may be prepared by reacting a mono acylated diamino anthraquinone with an ester of 1-chloro anthraquinone-2-carboxylic acid under the usual conditions of an Ullmann reaction, followed by hydrolysis to produce the mono acylamino ortho-carboxy 1,1-dianthrimide which is then subjected to ring closure in concentrated sulfuric acid with concurrent hydrolysis of the acylamino group. The present invention is, of course, not limited to the use of alpha amino dianthrimide acridones produced by any particular method.

Throughout the specification and claims the term "acyl" will be used in its more restricted sense as meaning the acid radical of a carboxylic acid.

The invention will be described in greater detail in conjunction with the following specific examples, the parts being by weight.

*Example 1*

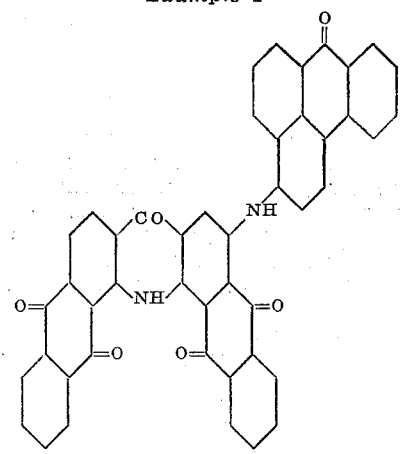

1-amino-4-benzoyl amino anthraquinone is reacted with 1-chloro anthraquinone-2-carboxylic acid benzyl ester in nitrobenzene solution in the presence of sodium carbonate or sodium acetate and a catalytic amount of a cupriferous compound. The mixture is heated with agitation for some hours at 185–190° C., cooled to room temperature, diluted with additional nitrobenzene, filtered, and the precipitate washed first with nitrobenzene and finally with alcohol. The filter cake is steamed to remove traces of nitrobenzene, slurried in an alkaline slurry, filtered, acidified with hydrochloric acid, again filtered and washed.

The product, which is 4-benzoylamino-1,1'-dianthrimide-2'-carboxylic acid benzyl ester is then hydrolyzed with alcoholic caustic potash in the presence of pyridine and water, drowned in hydrochloric acid and water, filtered and washed free of mineral acid. The resulting 4-amino-1,1'-dianthrimide-2'-carboxylic acid is then subjected to ring closure by dissolving in concentrated sulfuric acid, heating to 90° C., and maintaining for several hours. The solution is then diluted to 72% acid strength and cooled. The precipitate which forms is filtered off, boiled in water, filtered, and washed acid-free, and dried. It is 4-amino-1,1'-dianthrimide-2,2'-acridone.

118 parts of the 4-amino-1,1'-dianthrimide-2,2'-acridone and 93 parts of bz1-bromo benzanthrone are introduced into 1500 parts of nitrobenzene to which 33 parts of soda ash, 4 parts of copper powder and 2 parts of iodine have been added while agitating. The mixture is heated to the boil for about 12 hours, cooled to about 100° C. and filtered. The cake is washed with nitrobenzene and then steamed to remove the nitrobenzene producing a slurry which is acidified, stirred, filtered, and washed free of the acid. It is then dried and constitutes a black body which dissolves in concentrated sulfuric acid with an olive-brown color changing to green on dilution with water. It is capable of dyeing cotton a violet-brown shade from a violet colored bath.

*Example 2*

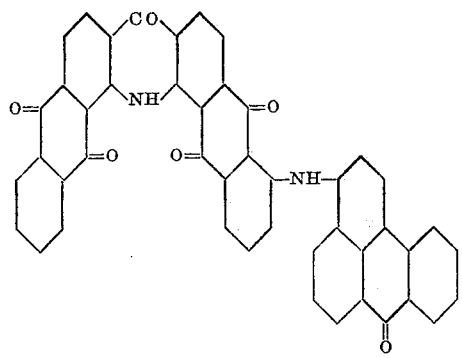

1-benzoylamino-5-amino anthraquinone is reacted with 1-chloro anthraquinone-2-carboxylic acid benzyl ester in nitrobenzene in the presence of sodium carbonate or sodium acetate and a small amount of cupriferous compound. The reaction which takes about 6 hours is effected at 185–190° C. On cooling to room temperature a brownish-red product precipitates which is filtered, washed with nitrobenzene and then with alcohol, steamed, and the alkaline slurry again filtered, reslurried and acidified, producing 5 - benzoylamino - 1,1' - dianthrimide - 2' - carboxylic acid benzyl ester.

The product is hydrolyzed to a free carboxylic acid with alcoholic caustic potash in the presence of pyridine and some water by boiling for some hours. After drowning and acidifying, followed by filtering and washing, the free carboxylic acid is obtained. This is then subjected to ring closure by dissolving in concentrated sulfuric acid, heating to 90° C. and maintaining for several hours. After cooling to about 50° C. the acid concentration is cut to about 71%, the resulting slurry is cooled and filtered. The brick red precipitate obtained is washed with a small amount of 70–71% sulfuric acid, slurried in warm water, filtered, washed and dried. A brown colored 5-amino-1,1'-dianthrimide-2,2'-acridone is obtained.

118 parts of the amino dianthrimide acridone, 81 parts of bz1-bromo benzanthrone, 33 parts of soda ash, 4 parts of copper powder and 2 parts of iodine crystals are introduced in 1200 parts of nitrobenzene, boiled for about 12 hours, cooled to 100° C., filtered and washed with nitrobenzene. The filter cake is then steamed, again filtered and dried, and constitutes a brown colored substance which dissolves in concentrated sulfuric acid with an orange color which first turns to a green when carefully diluted with a small portion of water. It dyes cotton a violet-brown shade from a violet vat and can be obtained in still greater purity by extraction with hot nitrobenzene.

*Example 3*

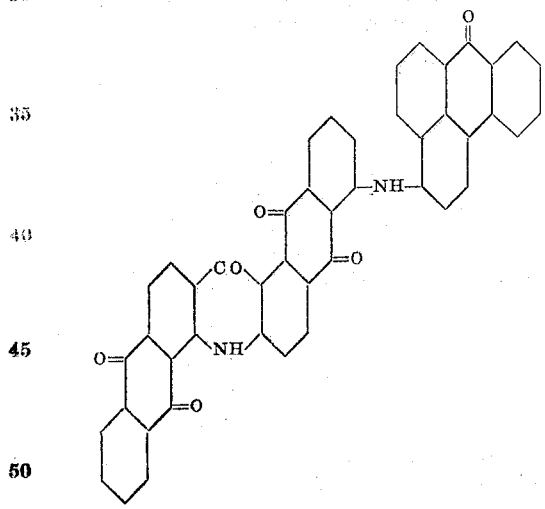

1-benzoylamine-6-chloro anthraquinone is reacted with 1-amino anthraquinone-2-carboxylic acid methyl ester in nitrobenzene in the presence of soda ash and anhydrous sodium acetate, a small amount of copper powder and iodine. The reaction is effected by boiling for some hours and on cooling and filtering 5-benzoylamino-2,1'-dianthrimide-2'-carboxylic acid methyl ester is produced which is hydrolyzed to the free acid by boiling in alcoholic caustic potash and pyridine, filtering and precipitating with hydrochloric acid.

The 5 - benzoylamino - 2,1' - dianthrimide - 2' - carboxylic acid is then subjected to ring closure in concentrated sulfuric acid starting at room temperature and heating up to 95–100° C., followed by precipitation on diluting to 60% sulfuric acid. On filtering, washing with 60% sulfuric acid and then warm water the 5-amino-2,1'-dianthrimide-1,2'-acridone is obtained.

43 parts of the amino dianthrimide acridone, 43 parts of bz1-bromo benzanthrone, 15 parts of soda ash, 3 parts of copper powder and 0.2 parts of iodine crystals are introduced into 900 parts of nitrobenzene and the reaction mixture boiled for about 12 hours. It is then cooled to about 110° C. and the precipitate filtered, washed with nitrobenzene and steamed to produce a slurry which is acidified hot, filtered, washed and dried.

The 5-benzanthronylamino-2,1'-dianthrimide-1,2'-acridone so obtained is a dark brown body dissolving in concentrated sulfuric acid with an orange brown color which changes to green when carefully diluted with a small amount of water. It dyes cotton a reddish bordeaux shade from a violet-blue vat.

We claim:

1. An alpha bz1-benzanthronylamino dianthrimide acridone of the group consisting of 4 - benzanthronylamino - 1 - 1' - dianthrimide-2-2'-acridone, 5-benzanthronylamino-1-1'-dianthrimide-2-2'-acridone and 5-benzanthronylamino-2,1'-dianthrimide-1,2'-acridone.

2. An alpha bz1-benzanthronylamino dianthrimide acridone having the following formula:

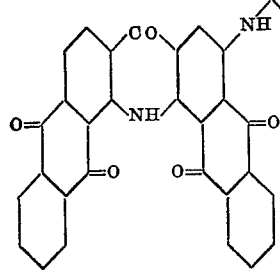

3. An alpha bz1-benzanthronylamino dianthrimide acridone having the following formula:

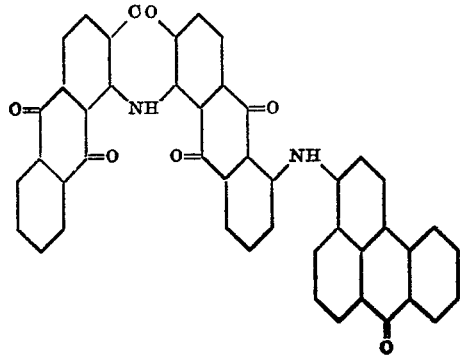

4. An alpha bz1-benzanthronylamino dianthrimide acridone having the following formula:

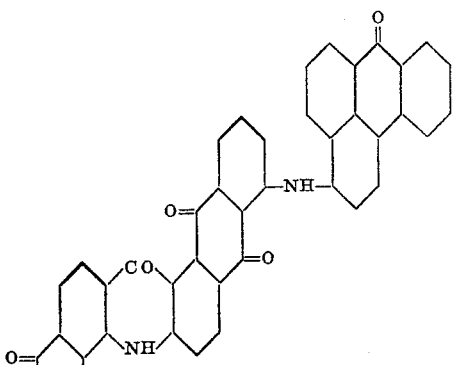

MARIO SCALERA.
ASA W. JOYCE.

REFERENCES CITED

The following references are of record in the file of this patent:

UNITED STATES PATENTS

| Number | Name | Date |
|---|---|---|
| 1,067,046 | Luttringhaus et al. | July 8, 1913 |
| 1,696,499 | Mieg | Dec. 25, 1928 |
| 1,706,933 | Mieg | Mar. 26, 1929 |
| 1,709,945 | Mieg et al. | Apr. 23, 1929 |
| 1,709,993 | Mieg et al. | Apr. 23, 1929 |
| 1,861,921 | Honold | June 7, 1932 |
| 1,909,691 | Kunz et al. | May 16, 1933 |
| 2,008,157 | Smith et al. | July 16, 1935 |
| 2,014,790 | Thomson | Sept. 17, 1935 |
| 2,111,074 | Lycan | Mar. 15, 1938 |

FOREIGN PATENTS

| Number | Country | Date |
|---|---|---|
| 8,230 | Great Britain | 1912 |
| 8,941 | Great Britain | 1911 |
| 268,219 | Germany | Dec. 10, 1912 |